United States Patent [19]

Sugawara et al.

[11] Patent Number: 4,985,208
[45] Date of Patent: Jan. 15, 1991

[54] POLYMERIZATION REACTION APPARATUS

[75] Inventors: Hitoshi Sugawara, Kisarazu; Minoru Goto, Kitakyushu; Yoshitaka Sakamaki, Kimitsu; Toshio Fujita, Kitakyushu, all of Japan

[73] Assignee: Nippon Steel Chemical Co., Ltd., Tokyo, Japan

[21] Appl. No.: 172,899

[22] Filed: Mar. 25, 1988

[30] Foreign Application Priority Data

Mar. 27, 1987 [JP] Japan .................................. 62-71378

[51] Int. Cl.$^5$ ............................................. B01F 15/06
[52] U.S. Cl. ..................................... 422/135; 422/138; 422/195; 422/202; 422/205; 366/147; 165/109.1
[58] Field of Search ............... 422/134, 135, 138, 195, 422/202, 203, 205; 366/144–149; 165/190.1

[56] References Cited

U.S. PATENT DOCUMENTS

| | | | |
|---|---|---|---|
| 2,727,884 | 12/1955 | McDonald . | |
| 2,899,176 | 8/1959 | Francis et al. | 366/149 |
| 3,365,176 | 1/1968 | Christensen | 366/147 |
| 3,480,404 | 11/1969 | Upson | 366/147 |
| 3,836,336 | 9/1974 | Yasui et al. | 422/137 |
| 4,029,143 | 6/1977 | Goebel | 165/109.1 |
| 4,067,553 | 1/1978 | Yamaoka | 366/147 |

FOREIGN PATENT DOCUMENTS

| | | | |
|---|---|---|---|
| 683994 | 11/1939 | Fed. Rep. of Germany ... | 165/109.1 |
| 57-125202 | 8/1982 | Japan . | |
| 66648 | 4/1984 | Japan | 165/109.1 |
| 252304 | 2/1970 | U.S.S.R. | 422/135 |

OTHER PUBLICATIONS

Chemie Ingenieur Technik, vol. 54, No. 6, juin 1982, pp. 541–549, Nurnberg DE; H. Gerstenberg et al.: "Rukrkessel-Reaktoren fur Polymer-Synthesen", *P. 548, Tableau 4; p. 549, tableau 5*.

Primary Examiner—Robert J. Warden
Assistant Examiner—D. John Griffith, Jr.
Attorney, Agent, or Firm—Armstrong, Nikaido, Marmelstein, Kubovcik & Murray

[57] ABSTRACT

This invention relates to a polymerization reaction apparatus which is composed of a vertical cylindrical vessel, a rotating shaft inside the vessel, a plurality of agitating blades attached to the shaft, and a large number of plate-like heat transfer elements attached to the inner wall of the vessel, disposed radially between the agitating blades, and internally equipped with a passage for a heat transfer fluid, and in which apparatus a polymerizing mass passes through a gap between the rotating shaft, the agitating blades, and a large number of the plate-like heat transfer elements and exchanges heat with a heat transfer fluid circulating inside the plate-like heat transfer elements, effecting uniform removal of the reaction heat or uniform heating of the polymerizing mass and preventing vertical mixing.

4 Claims, 5 Drawing Sheets

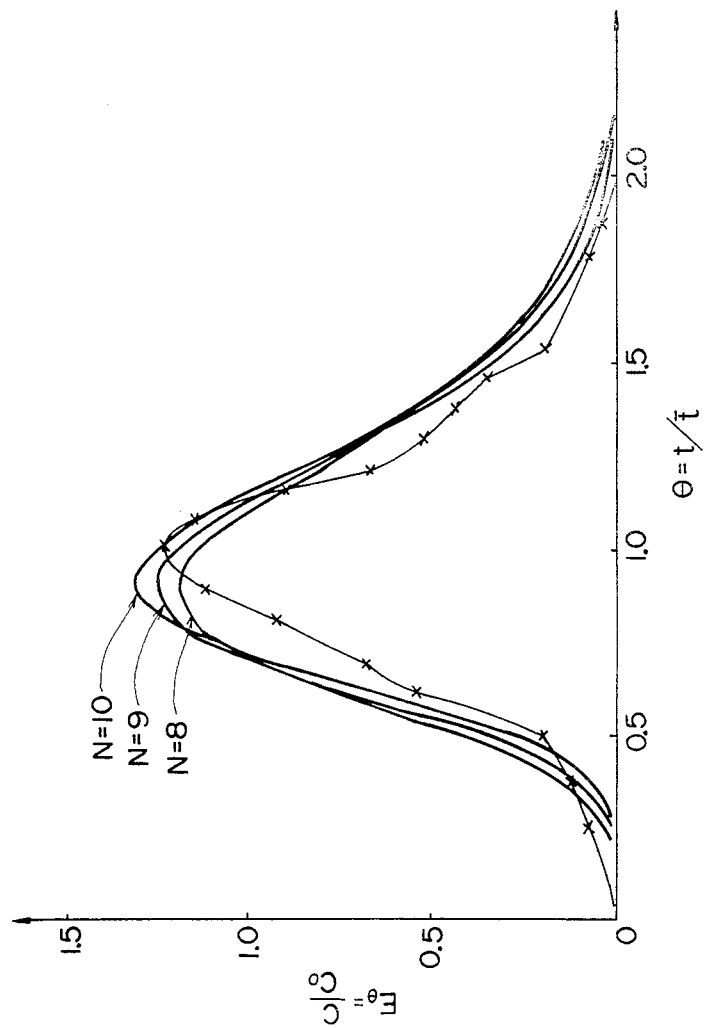

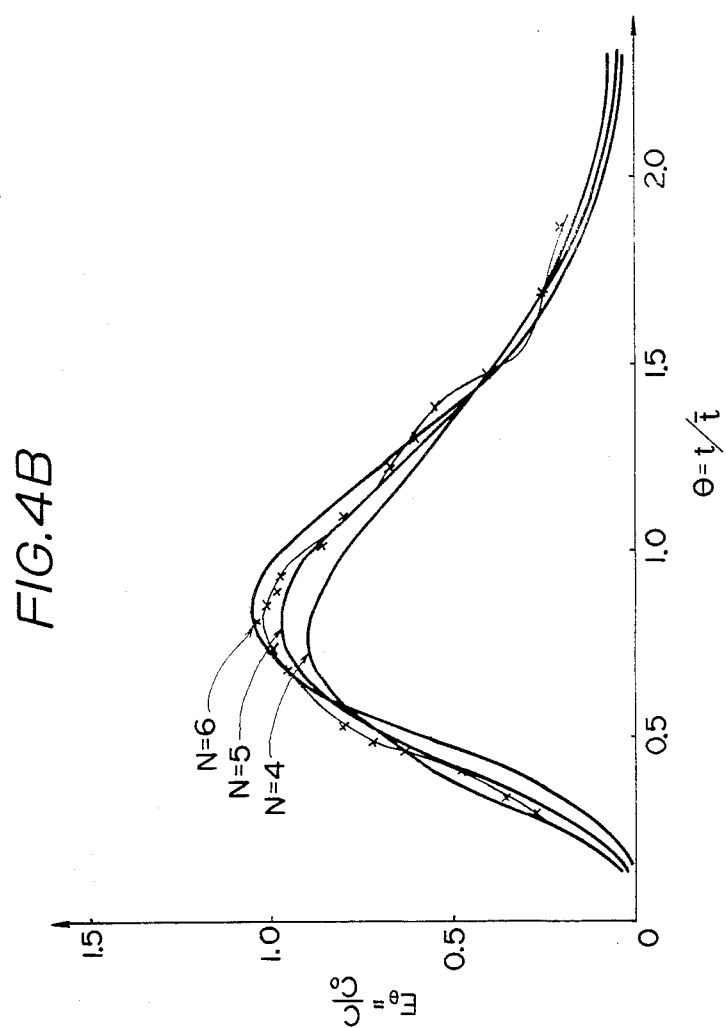

POLYMERIZATION REACTION APPARATUS

FIELD OF THE INVENTION AND RELATED ART STATEMENT

This invention relates to a polymerization reaction apparatus for making high-molecular-weight polymers, and more particularly, to a continuous polymerization reaction apparatus which permits uniform removal of the reaction heat or uniform heating of a reacting mass while effectively preventing vertical mixing of the reacting mass.

A number of processes are known for making high-molecular-weight polymers. Bulk polymerization has recently come into frequent use in view of its newly recognized advantages such as reduced environmental pollution hazards attributable to its operability in a closed system, conservation of raw materials and energy, and ease of adaptability to a continuous production system.

In the bulk polymerization process, the reacting mass generally shows low viscosity in the initial stage of the polymerization, and hence it is easy to handle. As the polymerization progresses, however, the viscosity of the polymerizing mass increases by geometrical progression and utmost care is required in handling. Now, a difference in thermal hysteresis experience which the polymers have received during the polymerization reaction appears as a difference in molecular weight distribution of the polymers. For example, stagnation of the reacting mass at some point in the system or non-uniform removal of the reaction heat makes it difficult to obtain polymers of consistently good quality. For this reason, those concerned with a polymerization process where a reacting mass becomes extermely viscous have made continued demands for development of an apparatus which produces a flow of the mass free of stagnation and cools or heats the polymerizing mass uniformly, and many proposals have been advanced.

For example, U.S. Pat. No. 2,727,884 discloses a vessel of square cross section having a surrounding chamber, a vertical rotating shaft running centrally through the vessel and having a number of agitating blades, and alternate banks of parallel tubes for passage of a heat transfer medium disposed at right angle to each other and between the agitating blades and connected to the surrounding chamber; a cooling fluid passes from the surrounding chamber through the tubes and removes the reaction heat from the polymerizing mass flowing down through the agitating blades. Also, Japanese Kokai Document No. 1982-125,202 describes a cylindrical vessel having a rotating shaft inside with double helical blades attached along the shaft and having baffles or vertical multitude heat exchangers installed between the agitating blades.

The former invention, however, utilizes the tubes disposed in parallel as a means of heat removal and this arrangement does not permit an increase in heat transfer surface and, in the absence of sufficient agitation, tends to cause lattice-shaped channeling in the direction of the flow of the polymerizing mass or create stagnation; thus, it does not offer a completely satisfactory solution to the provision of a desired vertically unmixed flow and uniform heat removal. The latter invention, with the baffles and the vertical mutlitude heat exchangers, presents a problem that a heat transfer surface per unit volume of the polymerizing mass cannot be made sufficiently large.

OBJECT AND THE SUMMARY OF THE INVENTION

An object of this invention is to provide a polymerization reaction apparatus which produces a flow without vertical mixing, has a large heat transfer surface per unit volume of the polymerizing mass, and is highly effective for uniformly removing or adding heat.

Another object of this invention is to provide a polymerization reaction apparatus particularly useful for a mass polymerization reaction.

The polymerization reaction apparatus of this invention comprises a vertical cylindrical vessel having at its end respectively an inlet and an outlet for a reacting mass, a vertical rotating shaft inside said vessel, a plurality of horizontal agitating blades attached to said rotating shaft at prescribed intervals along the axis of said rotating shaft, and a large number of plate-like heat transfer elements, said plate-like heat transfer elements being internally provided with a passage for a heat transfer fluid entering from the outer wall, protruded at prescribed intervals from around the inner wall of said vessel into the space between said agitating blades, and disposed radially around the rotating shaft, and in which apparatus a reacting mass fed from the inlet of said vessel passes through a gap between said large number of plate-like heat transfer elements.

The polymerization reaction apparatus of this invention is preferably constructed such that a jacket is provided around the outside of said vessel for circulation of a heat transfer fluid, said jacket has partitions at the positions corresponding to the plate-like heat transfer elements at each level, the compartments inside the jacket made by the partitions are connected to the plate-like heat transfer elements, and a heat transfer fluid introduced from the inlet therefor flows alternately through the compartments and plate-like heat transfer elements and goes out of the outlet.

The rotating shaft installed inside said vessel is constructed of a hollow cylinder with the ratio of the outside diameter of the shaft (d) to the inside diameter of the vessel (D) chosen in the range from 0.3 to 0.6, preferably 0.5 or so. If the ratio d/D becomes less than 0.3, the polymerizing mass tends to stagnate around the rotating shafts; furthermore, the agitating blades produce a large difference in the shear force in the radial direction in the cross section of the cylindrical vessel, causing difficulties in obtaining a uniform polymerization reaction and a flow without vertical mixing. On the other hand, any ratio d/D in excess of a 0.6 is more effective for producing a flow without vertical mixing, but causes an undesirable increase in the size of the apparatus.

The agitating blades to be attached to the aforesaid rotating shaft may be of any shape, for example, plate, bar, blade, angle and spiral, as long as they are able to agitate the polymerizing mass in the same horizontal plane without back mixing, and they are attached singly or plurally to the shaft as regularly spaced levels. Agitation plays an indispensable role in the polymerization reaction apparatus in that it not only prevents a non-uniform flow or stagnation due to channeling in a cross-section plane inside the vessel, but also, in the cases where rubber-containing styrene monomer- undergoes polymerization, effects phase inversion of the rubber and polystyrene phases in the preliminary polymerization step and provides a shear force suitable for the control of the rubber particle size and for the prevention of coagulation of the rubber in the main polymerization step.

The aforesaid plate-like heat transfer elements are preferably tapered in cross section from the inner wall towards the rotating shaft, thus keeping constant the space between the neighboring plate-like heat transfer elements. More preferably, each such plate-like heat transfer element is provided on its inside with plural alternately disposed reinforcing plates for the purposes of improving its strength and heat exchange efficieny, and forming a zigzag passage for a heat transfer fluid.

The polymerization reaction apparatus of this invention is applicable to a reacting mass containing one monomer, a mixture of two or more monomers, or a mixture of one or more than one monomer and polymers. Examples include styrene or α-methylstyrene, styrene monomer containing rubber such as polybutadiene and styrene-butadiene rubber, a mixture of monomers for the manufacture of styrene-acrylonitrile copolymers or styrene-methyl methacrylate copolymers, a mixture of monomers and polymers for the manufacture of rubber-containing styrene-acrylonitrile copolymers, and monomers for the manufacture of polyamides or polyesters. In addition, the apparatus of this invention is applicable to other reactions undergoing a bulk or solution polymerization and also to those undergoing a condensation or addition polymerization. In the case of a solution polymerization reaction, the conversion should preferably be kept at 30% by weight or below.

With the use of the polymerization reaction apparatus of this invention, the reacting mass fed from the inlet of the vessel flows through the gap between a large number of the plate-like heat transfer elements placed inside the space between the rotating shaft and the inner wall while exchanging heat with a heat transfer fluid and the heat transfer surface can be controlled at will by increasing or decreasing the number and length of the plate-like heat transfer elements. Moreover, it is possible to decrease the vertical distance between the horizontal agitating blades, which keeps the power consumption for agitating from increasing to any significant extent. The plate-like heat transfer elements disposed radially can be used to enhance the agitating effect, thus achieving uniform cooling or heating. The horizontal cross section of the vessel is uniformly partitioned by the radially disposed plate-like heat transfer elements, which prevents formation of dead spaces responsible for stagnation of the flow and markedly enhances the efficiency of preventing vertical mixing of the reacting mass.

BRIEF DESCRIPTION OF THE DRAWINGS

FIGS. 4(a) and 4(b) are graphs showing pulse response curves from the tracer experiments.

DETAILED DESCRIPTION OF THE PREFERRED EMBODIMENT

The polymerization reaction apparatus of this invention will be more particularly described with reference to the example in the accompanying drawings and the tests carried out in the example.

Figure 1:
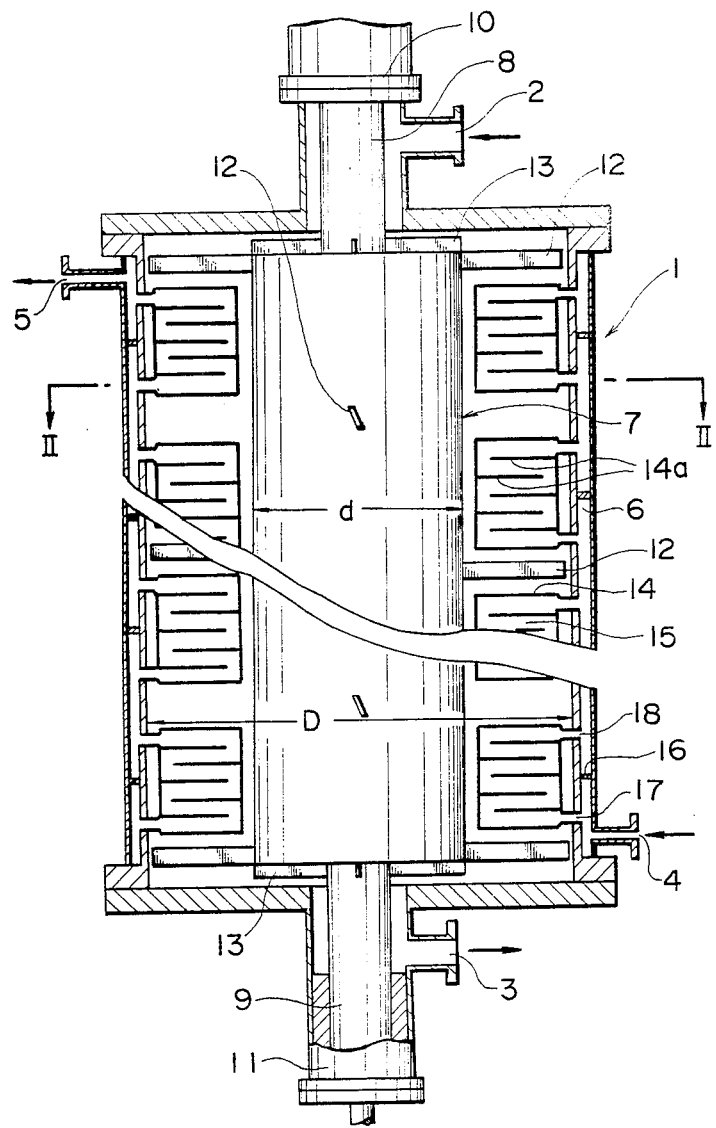
FIG. 1 is a vertical cross section of one embodiment of the polymerization apparatus of this invention.
Figure 2:
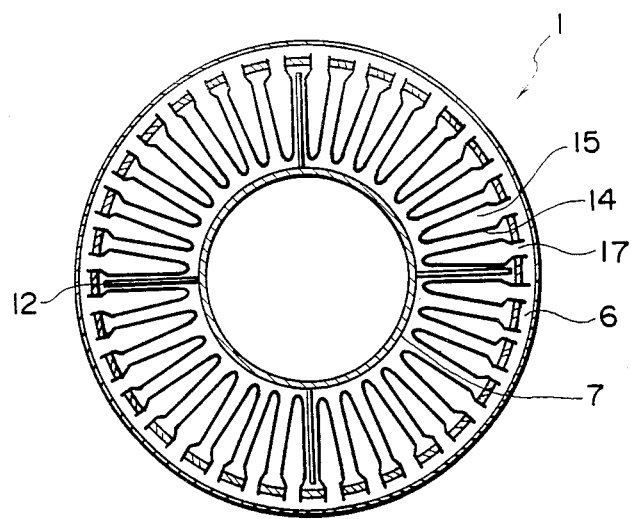
FIG. 2 is a cross section along the II—II line of FIG. 1.
Figure 3:
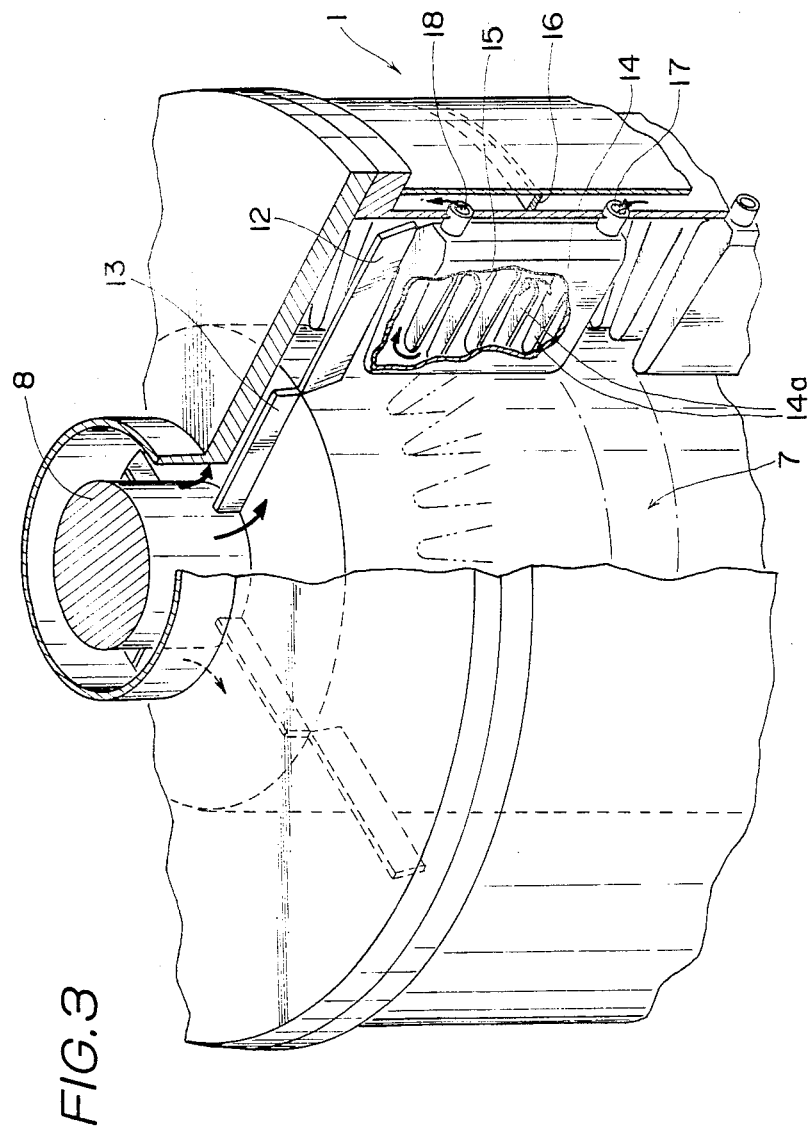
FIG. 3 is an oblique view, partly in section, of the plate-like heat transfer elements of FIGS. 1 and 2.

The polymerization reaction apparatus of this invention is shown in FIGS. 1 through 3. The numeral 1 in the drawings indicates a vertical cylindrical vessel which has in the center of the top cover a nozzle provided with an inlet 2 for the reacting mass and another nozzle in the center of the bottom cover similarly provided with an outlet 3 for the polymerizing mass containing the unchanged reactants. The outer wall of the vessel has jacket 6 equipped with an inlet 4 and an outlet 5.

In the cylindrical vessel 1, the inlet 2 and the outlet 3 for the reacting mass can change their places, with the inlet at the bottom and the outlet at the top, and the position of their attachment need not be restricted to the side wall of the aforesaid nozzles, but may be on the top cover or the bottom one. Furthermore, the cylindrical vessel 1 may be adjusted to any length by such means as attaching flanges to both ends and connecting to other identically constructed vessels, and its cross section may be of any desired shape, for example, circular, square, or polygonal, preferably circular.

The aforesaid cylindrical vessel 1 has in its inside, preferably in the center, a vertical rotating shaft 7 having smaller protruding shafts 8 and 9 at ends, said protrusions being held in stuffing boxes 10 and 11 which are attached to the nozzles centrally provided on the top and bottom covers of the cylindrical vessel 1. One of the protrusions is connected through a reducer (not shown) to a motor (not shown) and can be put into rotating motion. The rotating shaft 7 is constructed in such a manner as to make the ratio of the outside diameter (d) of the rotating shaft 7 to the inside diameter (D) of the cylindrical vessel 1 0.5, and this design secures uniform agitation of the reacting mass in the radial direction.

The rotation shaft 7 has horizontal plate-like agitating blades 12 extending close to the inner wall of the cylindrical vessel 1, the blade being one or plural in number and attached inclined to the shaft are regularly spaced level along the axis. In case the rotating shaft 7 is constructed from a hollow clinder, each agitating blade 12 can protrude from the inside of the rotating shaft 7 and fixed, as such and this method of attachment is easy to apply even in the presence of the plate-like heat transfer elements to be described later. In this example, agitating plates 13 are attached to the protrusions 8 and 9 from the rotating shaft 7 for the purpose of uniformly introducing or withdrawing the reacting mass into, or from the cylindrical vessel 1.

A large number of plate-like heat transfer elements 14 are attached to the inner wall of the aforesaid cylindrical vessel 1, protruding at prescribed intervals from around the periphery into the space formed between the rotating blades 12 and converging towards the rotating shaft 7. Each plate-like heat transfer element 14 has five reinforcing plates 14a fixed alternately to opposite ends for improved strength and heat exchange efficiency and formation of a zigzag passage for a heat transfer fluid. In order for the reacting mass to pass smoothly through the space formed by the plate-like heat transfer elements 14 and the rotating shaft 7 without vertical mixing, it is desirable that the gap between the neighboring elements does not vary much in the radial direction. Therefore, the plate-like heat transfer element 14, in its horizontal cross section, is tapered from the inner wall of the cylindrical vessel 1 towards the rotating shaft 7 such as to maintain the horizontal gap between the neighboring plate-like heat transfer elements 14 constant. Moreover, the tip of each plate-like heat transfer element 14 comes close to the rotating shaft 7.

Around the outer wall of the aforesaid cylindrical vessel 1 is provided the jacket 6 through which a heat transfer fluid circulates. The jacket 6 is divided horizontally into compartments by partitions 16, and a compartment is connected to an adjacent plate-like heat transfer element 14 by means of an inlet nozzle 17 and an outlet nozzle 18 so that a heat transfer fluid enters the inlet 4, flows alternately through the compartments and the plate-like heat transfer elements, and goes out of the outlet 5. The heat transfer fluid is fed cold to the plate-like heat transfer element 14 to remove the polymerization heat from the reacting mass; it is possible to take out partitions 16 from the jacket 6, connect the plate-like heat transfer elements directly, and circulate the heat transfer fluid in two separate flows, one through the plate-like heat transfer elements 14 and another through the jacket 6.

The removal of polymerization heat was described above, but the polymerization reaction apparatus of this invention is naturally applicable to uniform heating by a heat transfer fluid.

In order to evaluate the mixing characteristics of the polymerization reaction apparatus of this invention in continuous use, an apparatus of the structure described in the above-mentioned example was built with the following dimension and tested on starch syrup as a model reacting mass under the conditions shown in Table 1:

| Vessel: | inside diameter (D) | 1,100 mm |
| --- | --- | --- |
| | height | 1,800 mm |
| Rotating shaft: | outside diameter (d) | 550 mm |
| Ratio d/D: | | 0.5 |
| Agitating blade: | 2 or 4 each at 5 levels | |
| Plate-like heat transfer element: | | |
| 46 tapered elements, each measuring 220 × 230 × (44–25) mm, disposed radially around the rotating shaft with a 25 mm gap between the neighboring elements in the space between each two rotating blades | | |

The starch syrup was pumped in from the inlet at the top of the vessel, allowed to flow down with the rotating shaft in motion at a given rpm, and circulated back to a feed tank.

For evaluation of the mixing characteristics of the apparatus, a tracer controlled at the same viscosity as the starch syrup was injected in pulse from the inlet at the top and its concentration was measured at the outlet. With the use of a continuous stirred tank reactor model, the number of tank reactor model was calculated and utilized to evaluate the mixing characteristics. The tank reactor model here uses the degree of mixing of the tracer at the outlet of the apparatus to estimate the eqivalent tank number (N) or the number of tanks of equal volume connected in series to bring about complete mixing; for example, N=1 means a completely mixed flow and N=∞ a completely unmixed flow.

The results are shown in Table 1. The pulse response curves of tests Nos. 2 and 3 are shown in FIGS. 4(A) and 4(B).

In FIG. 4, the horizontal axis indicates $\theta$ which is the ratio of the time elapsed from the introduction of the tracer (t) to the average residence time in the whole tank ($\bar{t}$) while the vertical axis indicates the ratio $E_{74}$ which is the ratio of the concentration of the tracer at the outlet (C) to the concentration of the tracer instantaneously mixed and diffused through the tank after the introduction ($C_0$). The symbol N represents equivalent tank number and the solid lines are based on the values theoretically calculated from the tank reactor model and the X's are plots of the experimental values.

TABLE 1

| | Test conditions and results | | |
| --- | --- | --- | --- |
| Test No. | 1 | 2 | 3 |
| Test conditions | | | |
| Flow rate (l/hr) | 4,300 | 3,900 | 3,800 |
| Viscosity (poise) | 28 | 50 | 8 |
| Agitating speed (rpm) | 20 | 40 | 60 |
| No. of agitating blades | 4 | 2 | 2 |
| Results | | | |
| Average residence time (second) | 671 | 756 | 745 |
| Equivalent tank no. | 9.7 | 9.7 | 5.9 |

As is apparent from Table 1 and FIGS. 4(A) and 4(B), the apparatus of this invention produces an equivalent tank number of approximately 10 or a flow of an extremely low degree of vertical mixing as the viscosity of the reacting mass increases, in spite of some differences in viscosity of the model solution and speed of the agitating blades. Connecting the experimental values in the graphs indicates no tailing at the right end and no occurrence of shortcutting or dead space.

It is thus evident that the polymerization reaction apparatus of this invention can achieve uniform cooling of a highly viscous reacting mass or uniform heating of a reacting mass, improves the efficiency of preventing vertical mixing, and is particularly applicable to a continuous bulk polymerization on an industrial scale.

What is claimed is:

1. A polymerization reaction apparatus which comprises a vertical cylindrical vessel having at opposite ends an inlet and an outlet for a reacting mass, a vertical rotating shaft inside said vessel, a plurality of horizontally agitating, blades attached to said rotating shaft at prescribed intervals along the axis of said rotating shaft and being adapted to agitate a reacting mass in the same horizontal plane without substantial backmixing, and a plurality of heat transfer plates, said plates being internally provided with a passage for a heat transfer fluid entering from the outer wall of said vessel, said plates protruding at predetermined intervals from around the inner wall of said vessel into the space between said agitating blades, and which are disposed radially around the rotating shaft thereby forming a plurality of vertical channels between said plates, and in which apparatus a reacting mass fed from the inlet of said vessel passes through said channels without substantial backmixing between said plurality of heat transfer plates.

2. A polymerization reaction apparatus according to claim 1 wherein the rotating shaft inside the vessel is constructed of a hollow cylinder with the ratio of the outside diameter (d) of the rotating shaft of the inside diameter (D) of the vessel being in the range of from 0.3 to 0.6.

3. A polymerization reaction apparatus according to claim 1 wherein said heat transfer plates are wedge shaped and tapered in horizontal cross section from the inner wall of the vessel towards the rotating shaft and are substantially evenly spaced apart from one another.

4. A polymerization reaction apparatus according to claim 1 wherein the vessel is provided with a jacket for circulation of a heat transfer fluid, said jacket having partitions at the positions corresponding to the heat transfer plates thereby dividing the jacket into vertically disposed compartments, the compartments and the heat transfer elements being interconnected, whereby the heat transfer fluid introduced from an inlet in said jacket flows alternately through the compartments and the heat transfer plates and out of an outlet in said jacket.

* * * * *